US011894169B2

(12) United States Patent
Yoshidome et al.

(10) Patent No.: US 11,894,169 B2
(45) Date of Patent: Feb. 6, 2024

(54) SOFT MAGNETIC POWDER, PRESSED POWDER BODY, AND MAGNETIC COMPONENT

(71) Applicant: TDK CORPORATION, Tokyo (JP)

(72) Inventors: Kazuhiro Yoshidome, Tokyo (JP); Hiroyuki Matsumoto, Tokyo (JP); Kenji Horino, Tokyo (JP); Satoko Mori, Tokyo (JP); Masakazu Hosono, Tokyo (JP); Yoshiki Kajiura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 127 days.

(21) Appl. No.: 16/413,848

(22) Filed: May 16, 2019

(65) Prior Publication Data

US 2019/0355498 A1 Nov. 21, 2019

(30) Foreign Application Priority Data

May 21, 2018 (JP) ................................ 2018-097136

(51) Int. Cl.
*H01F 1/153* (2006.01)
*C22C 38/00* (2006.01)
(Continued)

(52) U.S. Cl.
CPC ....... *H01F 1/15333* (2013.01); *C22C 38/007* (2013.01); *C22C 38/008* (2013.01);
(Continued)

(58) Field of Classification Search
CPC ..... H10F 1/15333; H01F 1/153–15391; H01F 1/15333; H01F 1/14741; H01F 1/15308;
(Continued)

(56) References Cited

U.S. PATENT DOCUMENTS 9,196,404 B2 11/2015 Otsuka et al.
2005/0236071 A1* 10/2005 Koshiba .............. H01F 1/15308 148/304
(Continued)

FOREIGN PATENT DOCUMENTS

EP 3301690 A1 4/2018
JP 3342767 B2 11/2002
(Continued)

OTHER PUBLICATIONS

JP-4562022-B2, Kenmotsu. (machine translation) (Year: 2010).*

*Primary Examiner* — John A Hevey
(74) *Attorney, Agent, or Firm* — Oliff PLC

(57) ABSTRACT

Disclosed is a soft magnetic powder including a main component represented by composition formula: $(Fe_{(1-(\alpha+\beta))}X1_{\alpha}X2_{\beta})_{(1-(a+b+c+d+e+f))}M_aB_bP_cSi_dC_eS_f$. X1 represents one or more selected from the group consisting of Co and Ni; X2 represents one or more selected from the group consisting of Al, Mn, Ag, Zn, Sn, As, Sb, Cu, Cr, Bi, N, and rare earth elements; and M represents one or more selected from the group consisting of Nb, Hf, Zr, Ta, Mo, W, Ti, and V. The following relations are satisfied: $0 \leq a \leq 0.140$; $0.020 < b \leq 0.200$; $0 < c \leq 0.150$; $0 \leq d \leq 0.060$; $0 \leq e \leq 0.030$; $0 \leq f \leq 0.010$; $\alpha \geq 0$; $\beta \geq 0$; and $0 \leq \alpha+\beta \leq 0.50$. An oxygen content ratio in the soft magnetic powder is from 300 ppm to 3,000 ppm as a mass ratio.

14 Claims, 3 Drawing Sheets

(51) Int. Cl.

| | |
|---|---|
| ***C22C 38/06*** | (2006.01) |
| ***C22C 38/16*** | (2006.01) |
| ***H01F 1/147*** | (2006.01) |
| ***C22C 38/10*** | (2006.01) |
| ***C22C 38/08*** | (2006.01) |
| ***C22C 38/04*** | (2006.01) |
| ***C22C 38/60*** | (2006.01) |

(52) U.S. Cl.
CPC .............. *C22C 38/04* (2013.01); *C22C 38/06* (2013.01); *C22C 38/08* (2013.01); *C22C 38/10* (2013.01); *C22C 38/105* (2013.01); *C22C 38/16* (2013.01); *C22C 38/60* (2013.01); *H01F 1/14741* (2013.01); *H01F 1/15308* (2013.01)

(58) Field of Classification Search
CPC ............. H01F 1/15366; H01F 1/14733; H01F 1/15325; H01F 1/22; C22C 38/00–60; C22C 45/00–10; C22C 38/007; C22C 38/008; C22C 38/04; C22C 38/06; C22C 38/16; C22C 38/60; C22C 33/0257; C22C 1/11; C22C 47/14; C22C 2202/02; C22C 38/08; C22C 38/10; C22C 38/105; C22C 38/30; C22C 38/40; C22C 38/42; C22C 38/52; B22F 2999/00; B22F 2201/02; B22F 9/082
See application file for complete search history.

(56) References Cited

U.S. PATENT DOCUMENTS

| | | | | |
|---|---|---|---|---|
| 2009/0266448 | A1* | 10/2009 | Ohta | C22C 45/02 148/403 |
| 2010/0097171 | A1* | 4/2010 | Urata | C21D 6/007 420/83 |
| 2010/0188186 | A1* | 7/2010 | Urata | H01F 41/0233 336/233 |
| 2014/0240077 | A1* | 8/2014 | Otsuka | H01F 3/08 336/233 |
| 2016/0177429 | A1 | 6/2016 | Urata et al. | |
| 2018/0090251 | A1* | 3/2018 | Kudo | C22C 38/32 |
| 2018/0090252 | A1* | 3/2018 | Kudo | C22C 38/32 |
| 2018/0096765 | A1 | 4/2018 | Yoshidome et al. | |
| 2018/0218810 | A1 | 8/2018 | Harada et al. | |
| 2018/0247745 | A1 | 8/2018 | Yoshidome et al. | |
| 2019/0156975 | A1 | 5/2019 | Urata et al. | |

FOREIGN PATENT DOCUMENTS

| | | | | |
|---|---|---|---|---|
| JP | 3771224 | B2 | 4/2006 | |
| JP | 4562022 | B2 * | 10/2010 | H01F 1/15308 |
| JP | 4562022 | B2 | 10/2010 | |
| JP | 2012-012699 | A | 1/2012 | |
| JP | 2016-015357 | A | 1/2016 | |
| JP | 6245391 | B1 | 12/2017 | |
| JP | 6245394 | B1 | 12/2017 | |
| JP | 2018-131683 | A | 8/2018 | |

* cited by examiner

SOFT MAGNETIC POWDER, PRESSED POWDER BODY, AND MAGNETIC COMPONENT

BACKGROUND OF THE INVENTION

The present invention relates to a soft magnetic powder, a pressed powder body, and a magnetic component part.

In recent years, there is a demand for lower power consumption and efficiency increase with regard to electronic equipment, information equipment, communication equipment, and the like. Furthermore, the demand for the above-described terms is becoming even stronger as society progresses toward a low-carbon society. Therefore, even for power supply circuits used in electronic equipment, information equipment, communication equipment, and the like, there is a demand for a reduction of energy loss or an increase in the power supply efficiency. Also for magnetic cores of magnetic devices that are used in power supply circuits, there is a demand for an increase in the saturation magnetic flux density, a decrease in the core loss (magnetic core loss), and the like.

In Patent document 1, a Fe—B-M (M=Ti, Zr, Hf, V, Nb, Ta, Mo, or W)-based soft magnetic amorphous alloy is described. The present soft magnetic amorphous alloy has good soft magnetic characteristics, such as a high saturation magnetic flux density compared to commercially available Fe amorphous alloys.

[Patent document 1] JP 3342767 B2

BRIEF SUMMARY OF THE INVENTION

However, currently, there is a demand for a soft magnetic powder having good soft magnetic characteristics and also having high powder resistance.

It is an object of the invention to provide a soft magnetic powder and the like having excellent soft magnetic characteristics and also having high powder resistance.

In order to achieve the above-described object, the soft magnetic powder of the invention is a soft magnetic powder including a main component represented by composition formula: $(Fe_{(1-(\alpha+\beta))}X1_{\alpha}X2_{\beta})_{(1-(a+b+c+d+e+f))}M_aB_bP_cSi_dC_eS_f$, wherein X1 represents one or more selected from the group consisting of Co and Ni;

X2 represents one or more selected from the group consisting of Al, Mn, Ag, Zn, Sn, As, Sb, Cu, Cr, Bi, N, and rare earth elements;

M represents one or more selected from the group consisting of Nb, Hf, Zr, Ta, Mo, W, Ti, and V;

$0 \leq a \leq 0.140$;

$0.020 < b \leq 0.200$;

$0 < c \leq 0.150$;

$0 \leq d \leq 0.060$;

$0 \leq e \leq 0.030$;

$0 \leq f \leq 0.010$;

$\alpha \geq 0$;

$\beta \geq 0$;

$0 \leq \alpha+\beta \leq 0.50$; and an oxygen content ratio in the soft magnetic powder is from 300 ppm to 3,000 ppm as a mass ratio.

Since the soft magnetic powder of the invention has the above-described configuration, the soft magnetic powder has excellent soft magnetic characteristics and can further increase the powder resistance. When the soft magnetic powder of the invention is used, it is easy to produce a pressed powder body having a high resistivity.

The soft magnetic powder of the invention may be amorphous.

The soft magnetic powder of the invention may include an amorphous phase and microcrystals, and a nanohetero structure with the microcrystals existing in the amorphous phase may be observed.

In regard to the soft magnetic powder of the invention, the microcrystals may have an average particle size of 0.3 to 10 nm.

In the soft magnetic powder of the invention, a structure comprised of Fe-based nanocrystals may be observed.

In regard to the soft magnetic powder of the invention, the Fe-based nanocrystals may have an average particle size of from 3 nm to 50 nm.

In the soft magnetic powder of the invention, a Fe composition network phase in which regions having a higher Fe content proportion than the Fe content proportion included in the entirety of the soft magnetic powder are connected may be observed by a three-dimensional atom probe, the Fe composition network phase may have maximum points of 400,000 or more points/$\mu m^3$ of the Fe content proportion, at which the Fe content proportion becomes locally higher than that of the surroundings, and the proportion of maximum points of the Fe content proportion having a coordination number of from 1 to 5 may be from 80% to 100%, among all of the maximum points of the Fe content proportion.

In regard to the soft magnetic powder of the invention, a volume proportion occupied by the Fe composition network phase in the entirety of the soft magnetic powder may be from 25 vol % to 50 vol %.

In regard to the soft magnetic powder of the invention, a volume resistivity in a state of being compacted at a pressure of 0.1 t/$cm^2$ may be from 0.5 kΩ·cm to 500 kΩ·cm.

A pressed powder body of the invention includes the above-described soft magnetic powder.

A magnetic component part of the invention has the above-described pressed powder body.

DETAILED DESCRIPTION OF INVENTION

Figure 1:
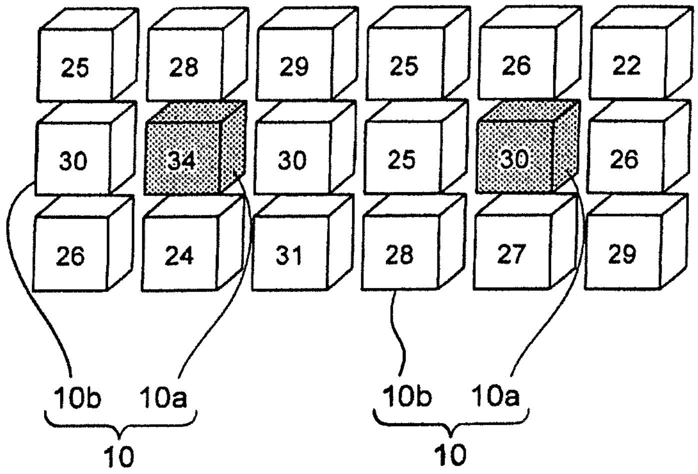
FIG. 1 is a schematic diagram illustrating a process of searching maximum points.

Hereinafter, embodiments of the invention will be described.

A soft magnetic powder according to the present embodiment is a soft magnetic powder including a main component represented by composition formula: $(Fe_{(1-(\alpha+\beta))}X1_{\alpha}X2_{\beta})_{(1-(a+b+c+d+e+f))}M_aB_bP_cSi_dC_eS_f$, wherein X1 represents one or more selected from the group consisting of Co and Ni, X2 represents one or more selected from the group consisting of Al, Mn, Ag, Zn, Sn, As, Sb, Cu, Cr, Bi, N, and rare earth elements, M represents one or more selected from the group consisting of Nb, Hf, Zr, Ta, Mo, W, Ti, and V, $0 \le a \le 0.140$;

$0.020 < b \le 0.200$;

$0 < c \le 0.150$;

$0 \le d \le 0.060$;

$0 \le e \le 0.030$;

$0 \le f \le 0.010$;

$\alpha \ge 0$;

$\beta \ge 0$;

$0 \le \alpha+\beta \le 0.50$; and the oxygen content ratio in the soft magnetic powder is from 300 ppm to 3,000 ppm as a mass ratio.

The soft magnetic powder according to the present embodiment has superior soft magnetic characteristics. That is, the soft magnetic powder has low coercivity He and high saturation magnetization σs. Furthermore, the soft magnetic powder has high powder resistance. For a pressed powder body including the soft magnetic powder according to the present embodiment, the volume resistivity can be easily increased. Specifically, it is easy to form a pressed powder body having a volume resistivity of from 0.5 kΩ·cm to 500 kΩ·cm.

In the following description, various components of the soft magnetic powder according to the present embodiment will be described in detail.

M represents one or more selected from Nb, Hf, Zr, Ta, Mo, W, Ti, and V.

The M content (a) satisfies $0 \le a \le 0.140$. That is, the soft magnetic powder may not contain M. The M content (a) is preferably such that $0.040 \le a \le 0.140$, and more preferably $0.040 \le a \le 0.100$. When M content (a) is large, the saturation magnetization σs is likely to decrease. Furthermore, when the soft magnetic powder does not contain M, it is preferable from the viewpoint that the saturation magnetic flux density becomes high compared to the case that the soft magnetic powder contains M.

The B content (b) satisfies $0.020 < b \le 0.200$. The B content (b) may satisfy $0.025 \le b \le 0.200$. Furthermore, it is preferable that $0.060 \le b \le 0.200$, and it is more preferable that $0.060 \le b \le 0.150$. When B content (b) is small, a crystalline phase formed from crystals having a particle size of more than 30 nm is likely to be produced in the soft magnetic powder before heat treatment, and when a crystalline phase is produced, the soft magnetic powder cannot be converted to a suitable structure by a heat treatment. Then, the coercivity is likely to increase. In a case in which B content (b) is large, saturation magnetization is likely to decrease.

The P content (c) satisfies $0 < c \le 0.150$. P content (c) may satisfy $0.001 \le c \le 0.150$. Furthermore, it is preferable that $0.010 \le c \le 0.150$, and it is more preferable that $0.050 \le c \le 0.080$. With regard to a soft magnetic alloy according to the present embodiment, it is speculated that as the soft magnetic alloy contains P, P is bonded to oxygen (O), and the powder resistance is increased. In a case in which c=0, that is, the soft magnetic alloy does not contain P, the coercivity is likely to increase. Furthermore, when the P content (c) is large, the saturation magnetization is likely to decrease.

The Si content (d) satisfies: $0 \le d \le 0.060$. That is, the soft magnetic powder may not contain Si. Furthermore, it is preferable that $0 \le d \le 0.030$. When the Si content (d) is large, the coercivity is likely to increase, and the saturation magnetization is likely to decrease.

The C content (e) satisfies: $0 \le e \le 0.030$. That is, the soft magnetic powder may not contain C. Furthermore, it is preferable that $0 \le e \le 0.010$. When the C content (e) is large, the coercivity is increased.

The S content (f) satisfies: $0 \le f \le 0.010$. That is, the soft magnetic powder may not contains S. Furthermore, it is preferable that $0 \le f \le 0.005$. When the S content (f) is large, the coercivity is increased.

Furthermore, in a case in which the soft magnetic powder does not contain S (in the case of f=0), the resistivity is likely to decrease as much as the soft magnetic powder contains C. However, by incorporating both C and S, the decrease in resistivity caused by incorporation of C can be easily suppressed.

The soft magnetic powder according to the present embodiment is such that the oxygen content ratio is from 300 ppm to 3,000 ppm as a mass ratio. Furthermore, it is preferable that the oxygen content ratio is from 800 ppm to 2,000 ppm. By controlling the oxygen content ratio to be in the above-described range, the saturation magnetization can be increased, and the powder resistance can be increased. Furthermore, it is easy to increase the volume resistivity of a pressed powder body including the soft magnetic powder according to the present embodiment, and specifically, in a case in which a pressure of 0.1 t/cm$^2$ is applied, a pressed powder body having a volume resistivity of from 0.5 kΩ·cm to 500 kΩ·cm can be obtained. It is because when a soft magnetic powder having high powder resistance is used, since sufficient insulation is achieved between the particles of the soft magnetic powder, a pressed powder body, or the like having both high soft magnetic characteristics and low losses can be obtained. When the oxygen content ratio is too low, the powder resistance is likely to decrease. When the oxygen content ratio is too high, the powder resistance is likely to decrease, and also, the saturation magnetization is likely to decrease.

Furthermore, in the soft magnetic powder according to the present embodiment, a part of Fe may be substituted with X1 and/or X2.

X1 is one or more selected from the group consisting of Co and Ni. In regard to the X1 content, a=0 may be satisfied. That is, the soft magnetic powder may not contain X1. Furthermore, the number of atoms of X1 is preferably 40 at % or less when the number of atoms of the entire composition is designated as 100 at %. That is, it is preferable that $0 \le \alpha\{1-(a+b+c+d+e+f)\} \le 0.400$ is satisfied.

X2 is one or more selected from the group consisting of Al, Mn, Ag, Zn, Sn, As, Sb, Cu, Cr, Bi, N and rare earth elements. In regard to the X2 content, 3=0 may be satisfied. That is, the soft magnetic powder may not contain X2. Furthermore, the number of atoms of X2 is preferably 3 at % or less when the number of atoms of the entire composition is designated as 100 at %. That is, it is preferable that $0 \le \beta\{1-(a+b+c+d+e+f)\} \le 0.030$ is satisfied.

The range of the amount of substitution of substituting Fe with X1 and/or X2 is set to be a half or less of Fe on the basis of the number of atoms. That is, the range of the amount of substitution is set to be such that $0 \le \alpha+\beta \le 0.500$. In the case of $\alpha+\beta > 0.500$, it is difficult to obtain the soft magnetic powder of the present embodiment by a heat treatment.

The (Fe+X1+X2) content is arbitrary; however, it is preferable that $0.690 \le (1-(a+b+c+d+e+f)) \le 0.900$ is satisfied.

When the value of (1−(a+b+c+d+e+f)) is adjusted to the above-described range, at the time of producing the soft magnetic powder of the present embodiment, a crystalline phase formed from crystals having a particle size of more than 30 nm is produced with even more difficulties.

The soft magnetic powder according to the present embodiment may include elements other than those described above as unavoidable impurities. For example, the soft magnetic powder may include the unavoidable impurities at a proportion of 0.1 mass % or less with respect to 100 mass % of the soft magnetic powder.

Furthermore, the soft magnetic powder according to the present embodiment may include an amorphous phase, and may have a nanohetero structure in which microcrystals exist in the amorphous phase. Inclusion of an amorphous phase, inclusion of microcrystals, and existence of a nanohetero structure can be observed by a method based on X-ray structural diffraction, a method of checking the presence or absence of lattices by a high-resolution image analysis by transmission electron microscopy, a method based on an electron diffraction pattern by transmission electron microscopy, and the like can be observed. The average particle size of the microcrystals is preferably from 0.2 nm to 10 nm.

Furthermore, for the soft magnetic powder according to the present embodiment, it is preferable that a structure included of Fe-based nanocrystals is observed by X-ray structural diffraction.

The Fe-based nanocrystals are crystals whose grain size is nano-order and whose crystal structure of Fe is bcc (body-centered cubic lattice structure). According to the present embodiment, it is preferable that the average particle size of the Fe-based nanocrystals is from 3 nm to 50 nm. A soft magnetic powder having a structure formed from such Fe-based nanocrystals is likely to have low coercivity He and is likely to have high saturation magnetization σs. Meanwhile, in a case in which Fe-based nanocrystals are observed by X-ray structural diffraction, it is usual that an amorphous phase is not observed; however, it is still acceptable that an amorphous phase is observed.

Furthermore, it is preferable that the soft magnetic powder according to the present embodiment has a Fe composition network phase. Hereinafter, the Fe composition network phase will be explained.

The Fe composition network phase is a phase having a higher content proportion of Fe than the average content proportion of Fe of the soft magnetic powder. When the Fe concentration distribution of the soft magnetic powder according to the present embodiment is observed using a three-dimensional atom probe (hereinafter, may be described as 3DAP), a state in which portions having higher Fe content proportions are distributed in a network form can be observed.

The embodiment of the Fe composition network phase can be quantitatively determined by measuring the number of maximum points of the Fe composition network phase and the coordination number of the maximum points.

A maximum point of the Fe composition network phase is a point at which the Fe content proportion becomes locally higher than the surroundings. Furthermore, the coordination number of maximum points is the number of other maximum points to which one maximum point is connected through the Fe composition network phase.

Hereinafter, the maximum points, the coordination number of maximum points, and the method for calculating those will be explained by providing an explanation on the analysis procedure for the Fe composition network phase according to the present embodiment, using the drawings.

First, a cube with each side measuring 40 nm in length is defined as a measurement range, and this cube is divided into cubic-shaped grids with each side measuring 1 nm in length. That is, 64,000 grids (40×40×40=64,000) exist in one measurement range.

Next, the Fe content proportion included in each grid is evaluated. Then, an average value (hereinafter, may be described as a threshold value) of the Fe content proportions in all of the grids is calculated. This average value of the Fe content proportions is a value substantially equivalent to the value calculated from the average composition of the soft magnetic powder.

Next, a grid in which the Fe content proportion exceeds the threshold value and the Fe content proportion is higher than the Fe content proportions of all adjacent grids, is designated as a maximum point. FIG. 1 illustrates a model showing a process of searching the maximum points. The number described in each grid 10 represents the Fe content proportion included in each grid. A grid in which the Fe content proportion is higher than or equal to the Fe content proportions of all adjoining adjacent grids 10*b* is designated as maximum point 10*a*.

Furthermore, in FIG. 1, eight adjacent grids 10*b* are described for one maximum point 10*a*; however, in fact, nine adjacent grids 10*b* each exist on the front side and the rear side of the maximum point 10*a* of FIG. 1. That is, twenty-six adjacent grids 10*b* exist for one maximum point 10*a*.

With regard to the grids 10 positioned at the edges of the measurement range, it is assumed that grids having a Fe content proportion of 0 exist on the outer side of the measurement range.

Figure 2:
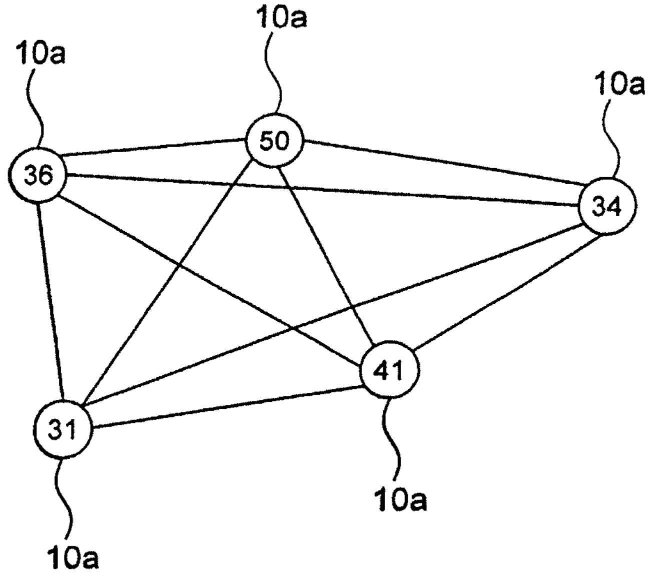
FIG. 2 is a schematic diagram illustrating a state in which line segments linking all of the maximum points have been produced.

Next, as illustrated in FIG. 2, line segments linking between all of the maximum points 10*a* included in the measurement range are produced. When the line segments are drawn, the respective grids are connected from center to center. In FIG. 2 to FIG. 5, the maximum points 10*a* are indicated as circles for the convenience of explanation. The number described inside each circle represents the Fe content proportion.

Figure 3:
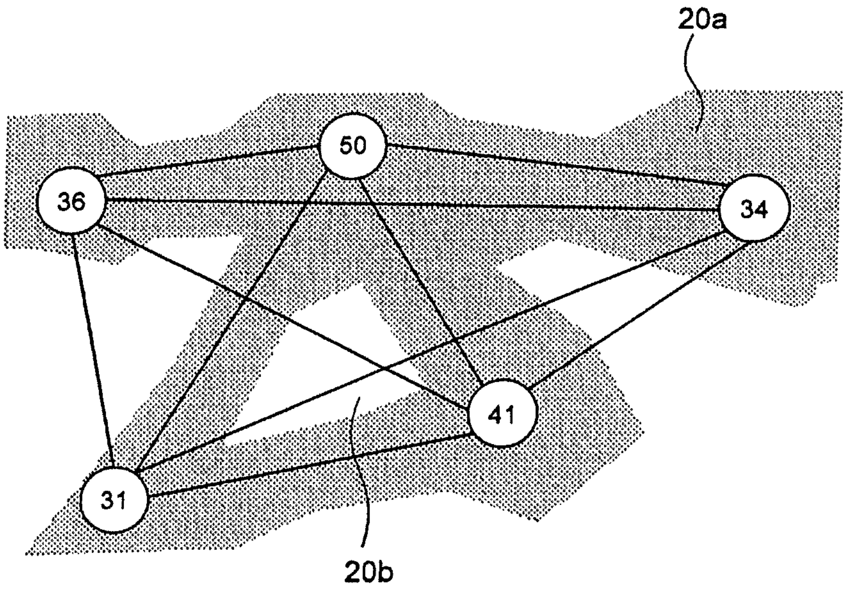
FIG. 3 is a schematic diagram illustrating a state of distinguishing between regions having a greater Fe content proportion than the average value and regions having a Fe content proportion less than or equal to the average value.
Figure 4:
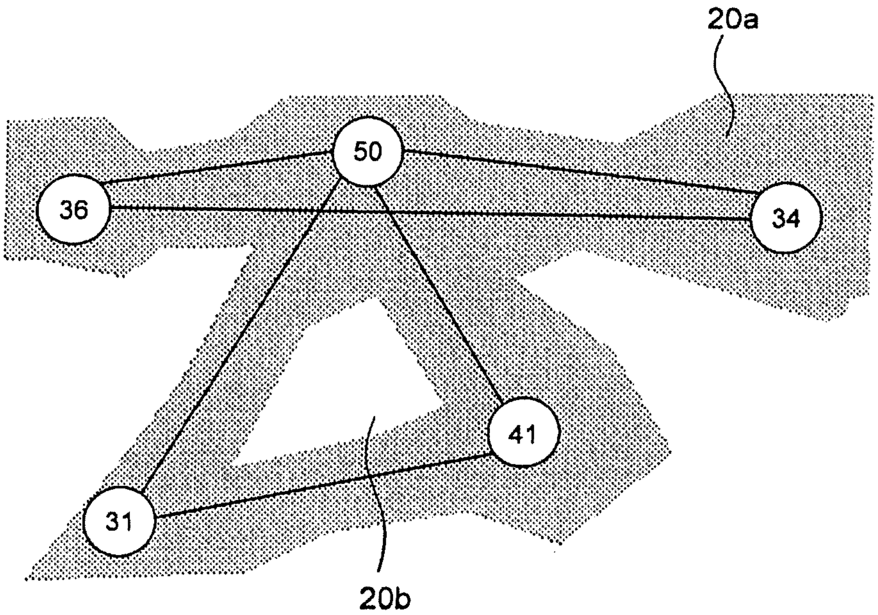
FIG. 4 is a schematic diagram illustrating a state in which line segments that pass through the regions having a Fe content proportion of less than or equal to the average value have been deleted.

Next, as illustrated in FIG. 3, regions (=Fe composition network phase) 20*a* having greater Fe content proportions than the threshold value and regions 20*b* having Fe content proportions less than or equal to the threshold value are distinguished. Then, as illustrated in FIG. 4, the line segments passing through the regions 20*b* are deleted.

Figure 5:
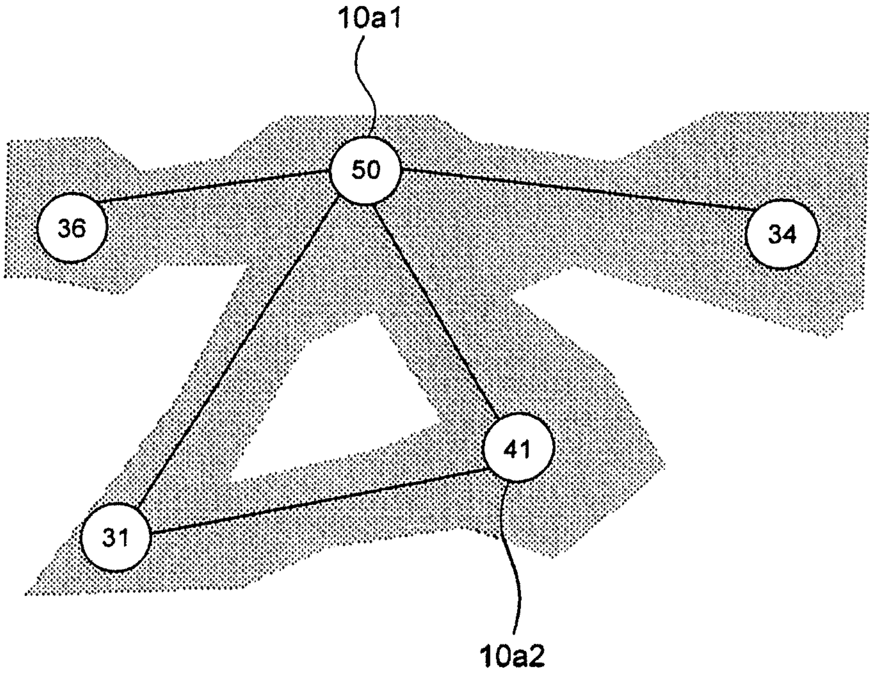
FIG. 5 is a schematic diagram illustrating a state in which when there is no portion having a Fe content proportion of less than or equal to the average value inside the triangle, the longest line segment among the line segments forming a triangle has been deleted.

Next, as illustrated in FIG. 5, in a case in which at a portion formed into a triangle by line segments, there is no region 20*b* on the inner side of the triangle, one longest line segment among the three line segments constituting this triangle is deleted. Finally, in the case in which maximum points exist in adjacent grids, the line segments linking those maximum points are deleted.

The number of line segments extending from the various maximum points 10*a* is designated as the coordination number of the respective maximum points 10*a*. For example, in the case of FIG. 5, maximum point 10*al* having a Fe content proportion of 50 has a coordination number of 4, and maximum point 10*a*2 having a Fe content proportion of 41 has a coordination number of 2.

Furthermore, when a grid existing on the outermost surface within a measurement range having a size of 40 nm×40 nm×40 nm shows a maximum point, this maximum point is excluded from the calculation of the proportion of maximum points that have the coordination number, which will be describe below, in a particular range.

Meanwhile, it is assumed that maximum points having a coordination number of zero, and regions existing in the surroundings of the maximum points having a coordination number of zero and having higher Fe content proportion than the threshold value are also included in the Fe composition network phase.

Regarding the measurement disclosed above, the accuracy of the results thus calculated can be sufficiently increased by performing the measurement several times in measurement ranges that are respectively different. Preferably, measurement is carried out three or more times in respectively different measurement ranges.

The Fe composition network phase existing in the soft magnetic powder according to the present embodiment has maximum points of 400,000 or more points/$\mu m^3$ of the Fe content proportion, at which the Fe content proportion is locally higher than that of the surroundings, and the proportion occupied by maximum points having a coordination number of from 1 to 5 in all of the maximum points of the Fe content proportion is from 80% to 100%. The denominator of the number of maximum points is the total volume of the measurement range, and is the sum of the volumes of regions 20*a* having a greater Fe content proportion than the threshold value and the volumes of regions 20*b* having a Fe content proportion less than or equal to the threshold value.

The soft magnetic powder according to the present embodiment becomes a soft magnetic powder having excellent soft magnetic characteristics by having a Fe composition network phase in which the number of maximum points and the proportion of maximum points having a coordination number of from 1 to 5 are within the above-described ranges. Specifically, the soft magnetic powder according to the present embodiment becomes a soft magnetic powder having low coercivity and high saturation magnetization.

Preferably, the proportion occupied by maximum points having a coordination number of from 2 to 4 in all of the maximum points of the Fe content proportion is from 70% to 90%.

Furthermore, it is preferable that the volume proportion occupied by the Fe composition network phase in the entirety of the soft magnetic powder (volume proportion occupied by regions 20*a* having a greater Fe content proportion than the threshold value in the sum of regions 20*a* having a greater Fe content proportion than the threshold value and regions 20*b* having a Fe content proportion less than or equal to the threshold value) is from 25 vol % to 50 vol %, and more preferably from 30 vol % to 40 vol %.

Hereinafter, a method for producing the soft magnetic powder according to the present embodiment will be explained.

Regarding the method for obtaining the soft magnetic powder of the present embodiment, for example, methods following a water atomization method or a gas atomization method are available. In the following description, a gas atomization method will be described.

In a gas atomization method, first, pure metals of the various metal elements to be included in the soft magnetic powder that is finally obtained are prepared, and the pure metals are weighed so as to obtain the same composition as the soft magnetic powder that is finally obtained. Then, the pure metals of the various metal elements are dissolved and mixed, and a mother alloy is produced. Meanwhile, there are no particular limitations on the method of dissolving the pure metals; however, for example, there is a method of drawing a vacuum in a chamber and then dissolving the pure metals by high-frequency heating. Meanwhile, the mother alloy and the soft magnetic powder that is finally obtained usually have the same composition except for the oxygen amount.

Next, the mother alloy thus produced is heated and melted, and a molten metal is obtained. The temperature of the molten metal is arbitrarily selected; however, for example, the temperature can be adjusted to 1,200° C. to 1,500° C. Subsequently, the molten alloy is sprayed inside a chamber, and thus a soft magnetic powder is produced. As the temperature of the molten metal is lower, the particle size of the microcrystals that will be described below is likely to become smaller, and it is difficult to produce microcrystals.

At this time, when the gas spray temperature is set to 50° C. to 200° C., and the vapor pressure inside the chamber is adjusted to 4 hPa or lower, it is easy to produce the soft magnetic powder to have a nanohetero structure. A nanohetero structure is a structure in which microcrystals exist in an amorphous phase. Furthermore, in this nanohetero structure, crystals having a particle size of more than 30 nm are not included. The presence or absence of crystals having a particle size of more than 30 nm can be checked by, for example, conventional X-ray diffraction measurement.

At this time point, when the soft magnetic powder is produced to have the nanohetero structure, it is easy to convert the soft magnetic powder into a structure formed from Fe-based nanocrystals by a heat treatment that will be described below. Furthermore, it is easy to convert the soft magnetic powder into a structure having the Fe composition network phase described above. Meanwhile, it is preferable that the microcrystals have an average particle size of 0.3 to 10 nm. The presence or absence of microcrystals and the average particle size thereof can be changed by, for example, controlling the temperature of the molten metal.

However, in a case in which the soft magnetic powder that is finally obtained may include an amorphous phase, the soft magnetic powder before heat treatment may not be produced to have the nanohetero structure and may be produced to have a structure including an amorphous phase only. Furthermore, when the soft magnetic powder that is finally obtained has the nanohetero structure, the soft magnetic powder before heat treatment may be produced to have a structure including only the amorphous phase, or the soft magnetic powder before heat treatment may be produced to have a nanohetero structure.

Furthermore, in regard to the method for observing the presence or absence of the above-described microcrystals and the average particle size thereof, there are no particular limitations; however, for example, the presence or absence of microcrystals and the average particle size thereof can be checked by obtaining a selected area electron diffraction image, a nanobeam diffraction image, a bright-field image, or a high-resolution image using a transmission electron microscope. When a selected area electron diffraction image or a nanobeam diffraction image is used, in the case of an amorphous phase with respect to the diffraction pattern, a ring-shaped diffraction is formed, while in the case of a non-amorphous phase, diffraction mottles attributed to the crystal structure are formed. Furthermore, when a bright-field image or a high-resolution image is used, the presence or absence of microcrystals and the average particle size thereof can be observed by observing the image by visual inspection at a magnification ratio of $1.00\times10^5$ to $3.00\times10^5$.

When a soft magnetic powder formed from a nanohetero structure is produced by a gas atomization method and then is subjected to a heat treatment, the soft magnetic powder can be easily converted to a suitable structure. Furthermore, the soft magnetic powder can be easily converted to a structure having the Fe composition network image described above.

The heat treatment conditions are arbitrarily selected. Preferred heat treatment conditions vary depending on the composition of the soft magnetic powder. When the soft magnetic powder that is finally obtained is produced into a structure formed from Fe-based nanocrystals and when the soft magnetic powder is produced into a structure having the Fe composition network phase, usually, a preferred heat treatment temperature is approximately 450° C. to 650° C., and a preferred heat treatment time is approximately 0.5 to 10 hours. However, depending on the composition, preferred heat treatment temperatures and heat treatment times that are not in the above-described ranges may also exist.

Furthermore, when the soft magnetic powder that is finally obtained is produced into a structure including an amorphous phase only or a nanohetero structure, it is preferable that the heat treatment temperature is adjusted to be lower than the above-described temperature, or the soft magnetic powder before heat treatment is produced into a structure including an amorphous phase only. In a case in which the heat treatment temperature is adjusted to be lower, specifically, it is preferable to set the heat treatment temperature to be approximately 300° C. to 350° C.

The atmosphere employed at the time of heat treatment is arbitrarily selected. For example, it is preferable to employ an inert atmosphere such as Ar gas. Furthermore, by controlling the oxygen partial pressure in the atmosphere at the time of heat treatment, the oxygen content ratio in the soft magnetic powder that is finally obtained can be controlled to be from 300 ppm to 3,000 ppm as a mass ratio. Meanwhile, the oxygen content ratio in the soft magnetic powder before heat treatment is about 150 ppm, and this is out of the range described above.

The method for controlling the oxygen content ratio in the soft magnetic powder that is finally obtained is arbitrarily selected. In addition to the method of controlling the oxygen partial pressure in the atmosphere employed at the time of heat treatment, for example, a method of controlling the oxygen content ratio by changing the oxygen partial pressure in the atmosphere employed at the time of producing the mother alloy may be used.

Furthermore, the atmosphere at the time of heat treatment is not particularly limited. The heat treatment may be carried out in an active atmosphere such as an air atmosphere, or may be carried out in an inert atmosphere such as Ar gas.

There are no particular limitations on the method of calculating the average particle size of the microcrystals or Fe-based nanocrystals that are included in the soft magnetic powder obtained by a heat treatment. For example, the average particle size can be calculated by making an observation using a transmission electron microscope. Furthermore, the method of identifying whether the crystal structure of the Fe-based nanocrystals is a bcc (body-centered cubic lattice structure) is also not particularly limited. For example, the crystal structure can be identified using X-ray diffraction measurement.

The powder resistance of the soft magnetic powder according to the present embodiment can be evaluated by means of the volume resistivity of a pressed powder body formed at 0.1 t/cm$^2$. A pressure of 0.1 t/cm$^2$ is a low pressure as the molding pressure. That is, before and after molding, changes in the shape and the like of the soft magnetic powder are very small. On the other hand, when the molding pressure is an even lower pressure, the density of the pressed powder body becomes so low that the volume resistivity of the pressed powder body may not be measured properly.

Therefore, the powder resistance of the sot magnetic powder can be evaluated by evaluating the volume resistivity of a pressed powder body obtained by molding the soft magnetic powder at 0.1 t/cm$^2$. When the oxygen content ratio of the soft magnetic powder is controlled to be from 300 ppm to 3,000 ppm, it is easy to obtain a soft magnetic powder having a powder resistance at which the volume resistivity of the pressed powder body is from 0.5 kΩ·cm to 500 kΩ·cm.

When the soft magnetic powder according to the present embodiment is mixed with a binder as appropriate, and then the mixture is subjected to pressure compacting molding using a mold, a pressed powder body having high volume resistivity can be obtained. That is, in the case of using a soft magnetic powder having high powder resistance, even if any arbitrary molding pressure at the time of pressure compacting molding is selected, a pressed powder body which exhibits high volume resistivity even if the filling ratio is increased can be obtained. Furthermore, the type and amount of the binder are arbitrarily selected, and the volume resistivity of the pressed powder body is also changed by the type or amount of the binder. Furthermore, when the surface of the soft magnetic powder is subjected to an oxidation treatment or is provided with an insulating coating film or the like before the soft magnetic powder is mixed with a binder, the volume resistivity of the pressed powder body can be further increased.

By subjecting the above-described pressed powder body to a heat treatment after molding as a strain relieving heat treatment, the coercivity can be decreased, and the core loss can also be decreased.

Furthermore, an inductance component is obtained by subjecting the above-described pressed powder body to coil winding. There are no particular limitations on the method of coil winding and the method of producing an inductance component.

For example, a method of winding at least one or more turns of coil around a pressed powder body produced by the above-described method may be used.

Furthermore, it is also possible to produce an inductance component, in which the pressed powder body according to the present embodiment is equipped with a winding coil therein, by pressure molding the soft magnetic powder according to the present embodiment in a state of being equipped with a winding coil inside, and integrating the soft magnetic powder and the coil.

Here, in a case in which an inductance component is produced using a soft magnetic powder, it is preferable to use a soft magnetic powder having a maximum particle size is 45 μm or less as the sieve diameter and having a median particle size (D50) of 30 μm or less, in view of obtaining excellent Q characteristics. In order to adjust the maximum particle size to 45 μm or less as the sieve diameter, a sieve having a mesh size of 45 μm is used, and only the portion of a soft magnetic powder that passes through the sieve may be used.

There is a tendency that as a soft magnetic powder having a large maximum particle size is used, the Q value in a high frequency region is decreased. Particularly, in the case of using a soft magnetic powder having a maximum particle size of greater than 45 μm as the sieve diameter, the Q value in a high frequency region may decrease to a large extent. However, in a case in which the Q value in a high frequency region is not considered important, a soft magnetic powder having large fluctuations can be used. Since a soft magnetic powder having large fluctuations can be produced at relatively low cost, in the case of using a soft magnetic powder having large fluctuations, the production cost can be reduced.

The pressed powder body according to the present embodiment can be used for any arbitrary use applications. The pressed powder body can be used in magnetic components, for example, a magnetic core, an inductance component, a transformer, and a motor.

Thus, various embodiments of the invention have been described; however, the invention is not intended to be limited to the above-described embodiments.

EXAMPLES

Hereinafter, the invention will be specifically described based on Examples.

Experiment Example 1

Raw material metals were weighed to obtain the alloy compositions of various Examples and Comparative Examples shown in the following tables, the raw material metals were dissolved by high frequency heating, and thus mother alloys were produced. Meanwhile, the composition of Sample No. 1 (Comparative Example) is the composition of an amorphous alloy that is generally well known.

Subsequently, the mother alloys thus produced were powdered by an atomization method, and thus soft magnetic powders were obtained. At this time, the temperature of the molten metal flowing down from a crucible was set to 1,250° C., the amount of downflow was set to 1 kg/minute, the inner diameter of the downflow port of the crucible was set to 1 mm, and the flow rate of the gas jet was set to 900 m/s. Subsequently, classification was performed using a classifier, and soft magnetic powders having an average particle size D50 of from 15 μm to 30 μm were obtained.

X-ray diffraction measurement was performed for each of the soft magnetic powders thus obtained, and the presence or absence of crystals having a particle size of more than 30 nm was checked. Then, in a case in which crystals having a particle size of more than 30 nm did not exist, it was considered that an amorphous phase was observed, and in a case in which crystals having a particle size of more than 30 nm existed, it was considered that the soft magnetic powder was formed of a crystalline phase. In all of Examples except for Sample No. 181 that will be described below, a nanohetero structure in which microcrystals having an average particle size of from 0.1 nm to 15 nm existed in an amorphous phase was observed.

Subsequently, the soft magnetic powders of the various specimens were subjected to a heat treatment for one hour at 600° C. The heat treatment was carried out in a nitrogen atmosphere. Furthermore, the oxygen content ratios of the soft magnetic powders after the heat treatment were controlled by controlling the oxygen concentration in the nitrogen atmosphere employed at the time of the heat treatment to be in the range of from 10 ppm to 10,000 ppm. For the various soft magnetic powders obtained after the heat treatment, the saturation magnetization σs and the coercivity He were measured. The saturation magnetization σs was measured in a magnetic field of 1,000 kA/m using a vibrating sample magnetometer (VSM). The coercivity He was measured in a magnetic field of 5 kA/m using a direct current BH tracer.

Subsequently, each of the soft magnetic powders obtained after the heat treatment was pressurized at a pressure of 0.1 $t/cm^2$, and the (volume) resistivity ρ was measured using a powder resistance device.

In the present Example, regarding the saturation magnetization σs, a value of 150 $A \cdot m^2/kg$ or higher was considered good. Regarding the coercivity Hc, a value of 4.0 Oe or less was considered good. Regarding the resistivity ρ, a value of from 0.5 kΩ·cm to 500 kΩ·cm was considered good, and a value of from 3 kΩ·cm to 500 kΩ·cm was considered more better. In the following tables, the case in which the resistivity ρ was 3 kΩ·cm or higher was rated as ⊙; the case in which the resistivity ρ was higher than or equal to 0.5 kΩ·cm and lower than 3 kΩ·cm was rated as ○; and the case in which the resistivity ρ was lower than 0.5 kΩ·cm or higher than 500 kΩ·cm was rated as x. Meanwhile, a specimen having a resistivity ρ of higher than 500 kΩ·cm did not exist.

In the Examples of Experiment Example 1 shown below, unless particularly stated otherwise, it was confirmed that the soft magnetic powders obtained after the heat treatment all had an average particle size of from 3 nm to 30 nm and had Fe-based nanocrystals having a bcc crystal structure, through X-ray diffraction measurement and an observation made using a transmission electron microscope. Furthermore, it was confirmed by using an inductively coupled plasma (ICP) analysis, that there was no change in the alloy composition before and after the heat treatment.

TABLE 1

| | | $Fe_{(1-(a+b+c+d+e+f))}M_aB_bP_cSi_dC_eS_f$ (α = β = 0, and M is Nb) | | | | | | | | | | | |
|---|---|---|---|---|---|---|---|---|---|---|---|---|---|
| | | Soft magnetic powder Composition (number for element other than O is ratio of number of atoms, and number for O is mass ratio) | | | | | | | | Powder characteristics | | | |
| | Example/ | | | | | | | | | | Coercivity | Saturation magnetization | Resistivity ρ |
| Sample No. | Comparative Example | Fe | M (Nb) a | B b | P c | Si d | C e | S f | O (ppm) | XRD | Hc (Oe) | σs ($A \cdot m^2/kg$) | at 0.1 $t/cm^2$ (Ω · cm) |
| 1 | Comparative Example | $Fe_{0.735}Nb_{0.03}B_{0.09}Si_{0.135}Cu_{0.01}$ | | | | | | | 300 | Amorphous phase | 1.2 | 131 | ○ |
| 2 | Comparative Example | 0.800 | 0.060 | 0.090 | 0.050 | 0.000 | 0.000 | 0.000 | 154 | Amorphous phase | 2.2 | 172 | X |
| 3 | Example | 0.800 | 0.060 | 0.090 | 0.050 | 0.000 | 0.000 | 0.000 | 321 | Amorphous phase | 2.2 | 173 | ○ |
| 4 | Example | 0.800 | 0.060 | 0.090 | 0.050 | 0.000 | 0.000 | 0.000 | 654 | Amorphous phase | 2.2 | 174 | ○ |
| 4a | Example | 0.800 | 0.060 | 0.090 | 0.050 | 0.000 | 0.000 | 0.000 | 820 | Amorphous phase | 2.2 | 174 | ⊙ |
| 5 | Example | 0.800 | 0.060 | 0.090 | 0.050 | 0.000 | 0.000 | 0.000 | 1093 | Amorphous phase | 2.2 | 175 | ⊙ |
| 5a | Example | 0.800 | 0.060 | 0.090 | 0.050 | 0.000 | 0.000 | 0.000 | 1975 | Amorphous phase | 2.2 | 173 | ⊙ |
| 6 | Example | 0.800 | 0.060 | 0.090 | 0.050 | 0.000 | 0.000 | 0.000 | 2345 | Amorphous phase | 2.2 | 173 | ○ |

TABLE 1-continued

| Sample No. | Example/ Comparative Example | Fe | M (Nb) a | B b | P c | Si d | C e | S f | O (ppm) | XRD | Coercivity Hc (Oe) | Saturation magnetization σs ($A \cdot m^2/kg$) | Resistivity ρ at 0.1 $t/cm^2$ ($\Omega \cdot cm$) |
|---|---|---|---|---|---|---|---|---|---|---|---|---|---|
| | | $Fe_{(1-(a+b+c+d+e+f))}M_aB_bP_cSi_dC_eS_f$ (α = β = 0, and M is Nb) Soft magnetic powder Composition (number for element other than O is ratio of number of atoms, and number for O is mass ratio) | | | | | | | | | Powder characteristics | | |
| 7 | Example | 0.800 | 0.060 | 0.090 | 0.050 | 0.000 | 0.000 | 0.000 | 2831 | Amorphous phase | 2.3 | 163 | ○ |
| 8 | Comparative Example | 0.800 | 0.060 | 0.090 | 0.050 | 0.000 | 0.000 | 0.000 | 3210 | Amorphous phase | 2.4 | 143 | X |

TABLE 2

| Sample No. | Example/ Comparative Example | Fe | M (Nb) a | B b | P c | Si d | C e | S f | O (ppm) | XRD | Coercivity Hc (Oe) | Saturation magnetization σs ($A \cdot m^2/kg$) | Resistivity ρ at 0.1 $t/cm^2$ ($\Omega \cdot cm$) |
|---|---|---|---|---|---|---|---|---|---|---|---|---|---|
| | | $Fe_{(1-(a+b+c+d+e+f))}M_aB_bP_cSi_dC_eS_f$ (α = β = 0, and M is Nb) Soft magnetic powder Composition (number for element other than O is ratio of number of atoms, and number for O is mass ratio) | | | | | | | | | Powder characteristics | | |
| 11 | Example | 0.840 | 0.020 | 0.090 | 0.050 | 0.000 | 0.000 | 0.000 | 1056 | Amorphous phase | 3.5 | 181 | ○ |
| 12 | Example | 0.820 | 0.040 | 0.090 | 0.050 | 0.000 | 0.000 | 0.000 | 1010 | Amorphous phase | 2.5 | 176 | ⊙ |
| 13 | Example | 0.810 | 0.050 | 0.090 | 0.050 | 0.000 | 0.000 | 0.000 | 1030 | Amorphous phase | 2.2 | 176 | ⊙ |
| 5 | Example | 0.800 | 0.060 | 0.090 | 0.050 | 0.000 | 0.000 | 0.000 | 1093 | Amorphous phase | 2.2 | 175 | ⊙ |
| 14 | Example | 0.780 | 0.080 | 0.090 | 0.050 | 0.000 | 0.000 | 0.000 | 1045 | Amorphous phase | 2.1 | 171 | ⊙ |
| 15 | Example | 0.760 | 0.100 | 0.090 | 0.050 | 0.000 | 0.000 | 0.000 | 1043 | Amorphous phase | 2.6 | 163 | ⊙ |
| 16 | Example | 0.740 | 0.120 | 0.090 | 0.050 | 0.000 | 0.000 | 0.000 | 1032 | Amorphous phase | 1.9 | 157 | ⊙ |
| 17 | Example | 0.720 | 0.140 | 0.090 | 0.050 | 0.000 | 0.000 | 0.000 | 1056 | Amorphous phase | 3.2 | 151 | ⊙ |
| 18 | Comparative Example | 0.710 | 0.150 | 0.090 | 0.050 | 0.000 | 0.000 | 0.000 | 1067 | Amorphous phase | 3.2 | 141 | ○ |

TABLE 3

| Sample No. | Example/ Comparative Example | Fe | M (Nb) a | B b | P c | Si d | C e | S f | O (ppm) | XRD | Coercivity Hc (Oe) | Saturation magnetization σs ($A \cdot m^2/kg$) | Resistivity ρ at 0.1 $t/cm^2$ ($\Omega \cdot cm$) |
|---|---|---|---|---|---|---|---|---|---|---|---|---|---|
| | | $Fe_{(1-(a+b+c+d+e+f))}M_aB_bP_cSi_dC_eS_f$ (α = β = 0, and M is Nb) Soft magnetic powder Composition (number for element other than O is ratio of number of atoms, and number for O is mass ratio) | | | | | | | | | Powder characteristics | | |
| 21 | Comparative Example | 0.870 | 0.060 | 0.020 | 0.050 | 0.000 | 0.000 | 0.000 | 984 | Crystalline phase | 354 | 184 | ○ |
| 22 | Example | 0.865 | 0.060 | 0.025 | 0.050 | 0.000 | 0.000 | 0.000 | 956 | Amorphous phase | 3.1 | 189 | ○ |
| 23 | Example | 0.830 | 0.060 | 0.060 | 0.050 | 0.000 | 0.000 | 0.000 | 1034 | Amorphous phase | 2.6 | 182 | ⊙ |
| 24 | Example | 0.810 | 0.060 | 0.080 | 0.050 | 0.000 | 0.000 | 0.000 | 1023 | Amorphous phase | 2.1 | 177 | ⊙ |
| 5 | Example | 0.800 | 0.060 | 0.090 | 0.050 | 0.000 | 0.000 | 0.000 | 1093 | Amorphous phase | 2.2 | 175 | ⊙ |
| 25 | Example | 0.770 | 0.060 | 0.120 | 0.050 | 0.000 | 0.000 | 0.000 | 1023 | Amorphous phase | 2.4 | 166 | ⊙ |
| 26 | Example | 0.740 | 0.060 | 0.150 | 0.050 | 0.000 | 0.000 | 0.000 | 1045 | Amorphous phase | 2.9 | 163 | ⊙ |
| 27 | Example | 0.690 | 0.060 | 0.200 | 0.050 | 0.000 | 0.000 | 0.000 | 1210 | Amorphous phase | 3.1 | 151 | ⊙ |
| 28 | Comparative Example | 0.680 | 0.060 | 0.210 | 0.050 | 0.000 | 0.000 | 0.000 | 1034 | Amorphous phase | 3.3 | 132 | ⊙ |

TABLE 4

| | | $Fe_{(1-(a+b+c+d+e+f))}M_aB_bP_cSi_dC_eS_f$ ($\alpha = \beta = 0$, and M is Nb) | | | | | | | | | | | |
|---|---|---|---|---|---|---|---|---|---|---|---|---|---|
| | | Soft magnetic powder Composition (number for element other than O is ratio of number of atoms, and number for O is mass ratio) | | | | | | | | Powder characteristics | | | |
| | Example/ | | | | | | | | | | Coercivity | Saturation magnetization | Resistivity ρ |
| Sample No. | Comparative Example | Fe | M (Nb) a | B b | P c | Si d | C e | S f | O (ppm) | XRD | Hc (Oe) | σs (A · $m^2$/kg) | at 0.1 t/$cm^2$ (Ω · cm) |
| 31 | Comparative Example | 0.850 | 0.060 | 0.090 | 0.000 | 0.000 | 0.000 | 0.000 | 1045 | Amorphous phase | 5.2 | 180 | ○ |
| 32 | Example | 0.849 | 0.060 | 0.090 | 0.001 | 0.000 | 0.000 | 0.000 | 1034 | Amorphous phase | 4.0 | 179 | ○ |
| 33 | Example | 0.845 | 0.060 | 0.090 | 0.005 | 0.000 | 0.000 | 0.000 | 1047 | Amorphous phase | 3.9 | 178 | ○ |
| 34 | Example | 0.840 | 0.060 | 0.090 | 0.010 | 0.000 | 0.000 | 0.000 | 1087 | Amorphous phase | 3.6 | 178 | ⊙ |
| 35 | Example | 0.820 | 0.060 | 0.090 | 0.030 | 0.000 | 0.000 | 0.000 | 1038 | Amorphous phase | 3.1 | 176 | ⊙ |
| 5 | Example | 0.800 | 0.060 | 0.090 | 0.050 | 0.000 | 0.000 | 0.000 | 1093 | Amorphous phase | 2.2 | 175 | ⊙ |
| 36 | Example | 0.770 | 0.060 | 0.090 | 0.080 | 0.000 | 0.000 | 0.000 | 1045 | Amorphous phase | 2.8 | 161 | ⊙ |
| 37 | Example | 0.750 | 0.060 | 0.090 | 0.100 | 0.000 | 0.000 | 0.000 | 1069 | Amorphous phase | 2.9 | 153 | ⊙ |
| 38 | Example | 0.700 | 0.060 | 0.090 | 0.150 | 0.000 | 0.000 | 0.000 | 1045 | Amorphous phase | 3.0 | 150 | ⊙ |
| 39 | Comparative Example | 0.690 | 0.060 | 0.090 | 0.160 | 0.000 | 0.000 | 0.000 | 1032 | Amorphous phase | 3.2 | 145 | ⊙ |

TABLE 5

| | | $Fe_{(1-(a+b+c+d+e+f))}M_aB_bP_cSi_dC_eS_f$ ($\alpha = \beta = 0$, and M is Nb) | | | | | | | | | | | |
|---|---|---|---|---|---|---|---|---|---|---|---|---|---|
| | | Soft magnetic powder Composition (number for element other than O is ratio of number of atoms, and number for O is mass ratio) | | | | | | | | Powder characteristics | | | |
| | Example/ | | | | | | | | | | Coercivity | Saturation magnetization | Resistivity ρ |
| Sample No. | Comparative Example | Fe | M (Nb) a | B b | P c | Si d | C e | S f | O (ppm) | XRD | Hc (Oe) | σs (A · $m^2$/kg) | at 0.1 t/$cm^2$ (Ω · cm) |
| 41 | Example | 0.730 | 0.080 | 0.120 | 0.070 | 0.000 | 0.000 | 0.000 | 1056 | Amorphous phase | 3.4 | 154 | ⊙ |
| 5 | Example | 0.800 | 0.060 | 0.090 | 0.050 | 0.000 | 0.000 | 0.000 | 1093 | Amorphous phase | 2.2 | 175 | ⊙ |
| 42 | Example | 0.880 | 0.040 | 0.030 | 0.050 | 0.000 | 0.000 | 0.000 | 1045 | Amorphous phase | 3.1 | 185 | ⊙ |
| 43 | Example | 0.900 | 0.030 | 0.029 | 0.041 | 0.000 | 0.000 | 0.000 | 1045 | Amorphous phase | 3.8 | 189 | ⊙ |

TABLE 6

| | | $Fe_{(1-(a+b+c+d+e+f))}M_aB_bP_cSi_dC_eS_f$ ($\alpha = \beta = 0$, and M is Nb) | | | | | | | | | | | |
|---|---|---|---|---|---|---|---|---|---|---|---|---|---|
| | | Soft magnetic powder Composition (number for element other than O is ratio of number of atoms, and number for O is mass ratio) | | | | | | | | Powder characteristics | | | |
| | Example/ | | | | | | | | | | Coercivity | Saturation magnetization | Resistivity ρ |
| Sample No. | Comparative Example | Fe | M (Nb) a | B b | P c | Si d | C e | S f | O (ppm) | XRD | Hc (Oe) | σs (A · $m^2$/kg) | at 0.1 t/$cm^2$ (Ω · cm) |
| 5 | Example | 0.800 | 0.060 | 0.090 | 0.050 | 0.000 | 0.000 | 0.000 | 1093 | Amorphous phase | 2.2 | 175 | ⊙ |
| 51 | Example | 0.790 | 0.060 | 0.090 | 0.050 | 0.010 | 0.000 | 0.000 | 1085 | Amorphous phase | 2.2 | 166 | ⊙ |
| 52 | Example | 0.780 | 0.060 | 0.090 | 0.050 | 0.020 | 0.000 | 0.000 | 1090 | Amorphous phase | 2.6 | 164 | ⊙ |
| 53 | Example | 0.770 | 0.060 | 0.090 | 0.050 | 0.030 | 0.000 | 0.000 | 985 | Amorphous phase | 2.8 | 161 | ⊙ |
| 54 | Example | 0.740 | 0.060 | 0.090 | 0.050 | 0.060 | 0.000 | 0.000 | 840 | Amorphous phase | 3.2 | 154 | ⊙ |
| 55 | Comparative Example | 0.730 | 0.060 | 0.090 | 0.050 | 0.070 | 0.000 | 0.000 | 1040 | Amorphous phase | 4.8 | 148 | ⊙ |

TABLE 7

| | | $Fe_{(1-(a+b+c+d+e+f))}M_aB_bP_cSi_dC_eS_f$ (α = β = 0, and M is Nb) | | | | | | | | | | | |
|---|---|---|---|---|---|---|---|---|---|---|---|---|---|
| | | Soft magnetic powder Composition (number for element other than O is ratio of number of atoms, and number for O is mass ratio) | | | | | | | | Powder characteristics | | | |
| Sample No. | Example/ Comparative Example | Fe | M (Nb) a | B b | P c | Si d | C e | S f | O (ppm) | XRD | Coercivity Hc (Oe) | Saturation magnetization σs (A · $m^2$/kg) | Resistivity ρ at 0.1 t/$cm^2$ (Ω · cm) |
| 5 | Example | 0.800 | 0.060 | 0.090 | 0.050 | 0.000 | 0.000 | 0.000 | 1093 | Amorphous phase | 2.2 | 175 | ⊙ |
| 61a | Example | 0.795 | 0.060 | 0.090 | 0.050 | 0.000 | 0.005 | 0.000 | 1034 | Amorphous phase | 2.1 | 174 | ⊙ |
| 61 | Example | 0.790 | 0.060 | 0.090 | 0.050 | 0.000 | 0.010 | 0.000 | 1056 | Amorphous phase | 2.0 | 174 | ⊙ |
| 62 | Example | 0.770 | 0.060 | 0.090 | 0.050 | 0.000 | 0.030 | 0.000 | 1045 | Amorphous phase | 2.4 | 173 | ○ |
| 63 | Comparative Example | 0.750 | 0.060 | 0.090 | 0.050 | 0.000 | 0.050 | 0.000 | 1106 | Amorphous phase | 4.9 | 159 | ○ |

TABLE 8

| | | $Fe_{(1-(a+b+c+d+e+f))}M_aB_bP_cSi_dC_eS_f$ (α = β = 0, and M is Nb) | | | | | | | | | | | |
|---|---|---|---|---|---|---|---|---|---|---|---|---|---|
| | | Soft magnetic powder Composition (number for element other than O is ratio of number of atoms, and number for O is mass ratio) | | | | | | | | Powder characteristics | | | |
| Sample No. | Example/ Comparative Example | Fe | M (Nb) a | B b | P c | Si d | C e | S f | O (ppm) | XRD | Coercivity Hc (Oe) | Saturation magnetization σs (A · $m^2$/kg) | Resistivity ρ at 0.1 t/$cm^2$ (Ω · cm) |
| 5 | Example | 0.800 | 0.060 | 0.090 | 0.050 | 0.000 | 0.000 | 0.000 | 1093 | Amorphous phase | 2.2 | 175 | ⊙ |
| 71 | Example | 0.798 | 0.060 | 0.090 | 0.050 | 0.000 | 0.000 | 0.002 | 1045 | Amorphous phase | 2.2 | 173 | ⊙ |
| 72 | Example | 0.795 | 0.060 | 0.090 | 0.050 | 0.000 | 0.000 | 0.005 | 1056 | Amorphous phase | 2.2 | 171 | ⊙ |
| 73 | Example | 0.790 | 0.060 | 0.090 | 0.050 | 0.000 | 0.000 | 0.010 | 1100 | Amorphous phase | 2.4 | 168 | ⊙ |
| 74 | Comparative Example | 0.785 | 0.060 | 0.090 | 0.050 | 0.000 | 0.000 | 0.015 | 1130 | Amorphous phase | 4.5 | 166 | ⊙ |

TABLE 9

| | | $Fe_{(1-(a+b+c+d+e+f))}M_aB_bP_cSi_dC_eS_f$ (α = β = 0, and M is Nb) | | | | | | | | | | | |
|---|---|---|---|---|---|---|---|---|---|---|---|---|---|
| | | Soft magnetic powder Composition (number for element other than O is ratio of number of atoms, and number for O is mass ratio) | | | | | | | | Powder characteristics | | | |
| Sample No. | Example/ Comparative Example | Fe | M (Nb) a | B b | P c | Si d | C e | S f | O (ppm) | XRD | Coercivity Hc (Oe) | Saturation magnetization σs (A · $m^2$/kg) | Resistivity ρ at 0.1 t/$cm^2$ (Ω · cm) |
| 34 | Example | 0.840 | 0.060 | 0.090 | 0.010 | 0.000 | 0.000 | 0.000 | 1087 | Amorphous phase | 3.6 | 178 | ⊙ |
| 91 | Example | 0.818 | 0.060 | 0.090 | 0.010 | 0.010 | 0.010 | 0.002 | 1050 | Amorphous phase | 3.1 | 177 | ⊙ |
| 92 | Example | 0.798 | 0.060 | 0.090 | 0.010 | 0.020 | 0.020 | 0.002 | 1030 | Amorphous phase | 3.1 | 171 | ⊙ |
| 93 | Example | 0.795 | 0.060 | 0.090 | 0.010 | 0.020 | 0.020 | 0.005 | 1040 | Amorphous phase | 2.9 | 171 | ⊙ |
| 35 | Example | 0.820 | 0.060 | 0.090 | 0.030 | 0.000 | 0.000 | 0.000 | 1038 | Amorphous phase | 3.1 | 176 | ⊙ |
| 94 | Example | 0.795 | 0.060 | 0.090 | 0.030 | 0.010 | 0.010 | 0.005 | 1000 | Amorphous phase | 2.5 | 168 | ⊙ |
| 95 | Example | 0.775 | 0.060 | 0.090 | 0.030 | 0.020 | 0.020 | 0.005 | 980 | Amorphous phase | 2.8 | 161 | ⊙ |
| 96 | Example | 0.778 | 0.060 | 0.090 | 0.030 | 0.020 | 0.020 | 0.002 | 1100 | Amorphous phase | 2.6 | 160 | ⊙ |
| 5 | Example | 0.800 | 0.060 | 0.090 | 0.050 | 0.000 | 0.000 | 0.000 | 1093 | Amorphous phase | 2.2 | 175 | ⊙ |
| 97 | Example | 0.775 | 0.060 | 0.090 | 0.050 | 0.010 | 0.010 | 0.005 | 1120 | Amorphous phase | 2.4 | 160 | ⊙ |
| 98 | Example | 0.755 | 0.060 | 0.090 | 0.050 | 0.020 | 0.020 | 0.005 | 1020 | Amorphous phase | 2.6 | 155 | ⊙ |

TABLE 10

| Sample No. | Example/ Comparative Example | Fe(1 − (a + b + c + d + e + f))MaBbPcSidCeSf (a to f are the same as Sample No. 5, and M is Nb) — Soft magnetic powder: M Type | O (mass ratio) (ppm) | Powder characteristics: XRD | Coercivity Hc (Oe) | Saturation magnetization σs (A · $m^2$/kg) | Resistivity ρ at 0.1 t/$cm^2$ (Ω · cm) |
|---|---|---|---|---|---|---|---|
| 5 | Example | Nb | 1093 | Amorphous phase | 2.2 | 175 | ⊙ |
| 101 | Example | Hf | 1034 | Amorphous phase | 2.1 | 171 | ⊙ |
| 102 | Example | Zr | 1040 | Amorphous phase | 2.2 | 170 | ⊙ |
| 103 | Example | Ta | 1042 | Amorphous phase | 2.1 | 170 | ⊙ |
| 104 | Example | Mo | 1040 | Amorphous phase | 2.3 | 169 | ⊙ |
| 105 | Example | W | 1030 | Amorphous phase | 2.2 | 171 | ⊙ |
| 106 | Example | V | 1100 | Amorphous phase | 2.3 | 170 | ⊙ |
| 107 | Example | $Nb_{0.5}Hf_{0.5}$ | 1200 | Amorphous phase | 2.1 | 169 | ⊙ |
| 108 | Example | $Zr_{0.5}Ta_{0.5}$ | 1230 | Amorphous phase | 2.2 | 168 | ⊙ |
| 109 | Example | $Nb_{0.4}Hf_{0.3}Zr_{0.3}$ | 1250 | Amorphous phase | 2.4 | 167 | ⊙ |

TABLE 11

Fe(1 − (a + b))X1aX2b (a to f are the same as Sample No. 5, and M is Nb)

| Sample No. | Example/ Comparative Example | Soft magnetic powder: X1 (ratio of number of atoms) Type | X1 α{1 − (a + b + c + d + e + f)} | X2 (ratio of number of atoms) Type | X2 β{1 − (a + b + c + d + e + f)} | O (mass ratio) (ppm) | Powder characteristics: XRD | Coercivity Hc (Oe) | Saturation magnetization σs (A · $m^2$/kg) | Resistivity ρ at 0.1 t/$cm^2$ (Ω · cm) |
|---|---|---|---|---|---|---|---|---|---|---|
| 5 | Example | — | 0.000 | — | 0.000 | 1093 | Amorphous phase | 2.2 | 175 | ⊙ |
| 111 | Example | Co | 0.010 | — | 0.000 | 1034 | Amorphous phase | 2.6 | 172 | ○ |
| 112 | Example | Co | 0.100 | — | 0.000 | 1045 | Amorphous phase | 2.9 | 174 | ○ |
| 113 | Example | Co | 0.400 | — | 0.000 | 985 | Amorphous phase | 3.6 | 172 | ○ |
| 114 | Example | Ni | 0.010 | — | 0.000 | 1043 | Amorphous phase | 2.2 | 178 | ○ |
| 115 | Example | Ni | 0.100 | — | 0.000 | 1020 | Amorphous phase | 2.1 | 167 | ○ |
| 116 | Example | Ni | 0.400 | — | 0.000 | 1100 | Amorphous phase | 2.0 | 164 | ○ |
| 117 | Example | — | 0.000 | Al | 0.001 | 1320 | Amorphous phase | 1.9 | 169 | ○ |
| 118 | Example | — | 0.000 | Al | 0.005 | 1220 | Amorphous phase | 2.2 | 168 | ⊙ |
| 119 | Example | — | 0.000 | Al | 0.010 | 1230 | Amorphous phase | 2.1 | 168 | ⊙ |
| 120 | Example | — | 0.000 | Al | 0.030 | 1320 | Amorphous phase | 2.2 | 167 | ⊙ |
| 121 | Example | — | 0.000 | Zn | 0.001 | 1240 | Amorphous phase | 2.3 | 171 | ○ |
| 122 | Example | — | 0.000 | Zn | 0.005 | 1320 | Amorphous phase | 2.3 | 169 | ○ |
| 123 | Example | — | 0.000 | Zn | 0.010 | 1240 | Amorphous phase | 2.2 | 167 | ⊙ |
| 124 | Example | — | 0.000 | Zn | 0.030 | 1300 | Amorphous phase | 2.3 | 164 | ⊙ |
| 125 | Example | — | 0.000 | Sn | 0.001 | 1320 | Amorphous phase | 2.3 | 171 | ○ |
| 126 | Example | — | 0.000 | Sn | 0.005 | 1330 | Amorphous phase | 2.2 | 170 | ⊙ |
| 127 | Example | — | 0.000 | Sn | 0.010 | 1230 | Amorphous phase | 2.2 | 167 | ⊙ |
| 128 | Example | — | 0.000 | Sn | 0.030 | 1200 | Amorphous phase | 2.4 | 165 | ⊙ |
| 129 | Example | — | 0.000 | Cu | 0.001 | 1450 | Amorphous phase | 2.0 | 171 | ⊙ |
| 130 | Example | — | 0.000 | Cu | 0.005 | 1200 | Amorphous phase | 2.0 | 169 | ⊙ |
| 131 | Example | — | 0.000 | Cu | 0.010 | 1250 | Amorphous phase | 1.9 | 167 | ⊙ |
| 132 | Example | — | 0.000 | Cu | 0.030 | 1250 | Amorphous phase | 2.0 | 165 | ⊙ |
| 133 | Example | — | 0.000 | Cr | 0.001 | 1260 | Amorphous phase | 2.3 | 174 | ⊙ |
| 134 | Example | — | 0.000 | Cr | 0.005 | 1280 | Amorphous phase | 2.1 | 168 | ⊙ |
| 135 | Example | — | 0.000 | Cr | 0.010 | 1210 | Amorphous phase | 2.1 | 166 | ⊙ |
| 136 | Example | — | 0.000 | Cr | 0.030 | 1200 | Amorphous phase | 2.3 | 163 | ⊙ |
| 137 | Example | — | 0.000 | Bi | 0.001 | 1280 | Amorphous phase | 2.2 | 171 | ⊙ |
| 138 | Example | — | 0.000 | Bi | 0.005 | 1260 | Amorphous phase | 2.1 | 170 | ⊙ |
| 139 | Example | — | 0.000 | Bi | 0.010 | 1230 | Amorphous phase | 2.1 | 165 | ⊙ |
| 140 | Example | — | 0.000 | Bi | 0.030 | 1500 | Amorphous phase | 2.4 | 163 | ⊙ |
| 141 | Example | — | 0.000 | La | 0.001 | 1450 | Amorphous phase | 2.3 | 168 | ⊙ |
| 142 | Example | — | 0.000 | La | 0.005 | 1230 | Amorphous phase | 2.4 | 166 | ⊙ |
| 143 | Example | — | 0.000 | La | 0.010 | 1340 | Amorphous phase | 2.5 | 162 | ⊙ |
| 144 | Example | — | 0.000 | La | 0.030 | 1600 | Amorphous phase | 2.6 | 158 | ⊙ |
| 145 | Example | — | 0.000 | Y | 0.001 | 1520 | Amorphous phase | 2.4 | 170 | ⊙ |
| 146 | Example | — | 0.000 | Y | 0.005 | 1200 | Amorphous phase | 2.3 | 168 | ⊙ |
| 147 | Example | — | 0.000 | Y | 0.010 | 1250 | Amorphous phase | 2.3 | 166 | ⊙ |
| 148 | Example | — | 0.000 | Y | 0.030 | 1450 | Amorphous phase | 2.3 | 163 | ⊙ |
| 149 | Example | Co | 0.100 | Al | 0.050 | 1200 | Amorphous phase | 2.5 | 166 | ⊙ |
| 150 | Example | Co | 0.100 | Zn | 0.050 | 1240 | Amorphous phase | 2.7 | 163 | ⊙ |

TABLE 11-continued

| | | Fe(1 − (a + b))X1aX2b (a to f are the same as Sample No. 5, and M is Nb) | | | | | | | | |
|---|---|---|---|---|---|---|---|---|---|---|
| | | Soft magnetic powder | | | | | Powder characteristics | | | |
| | | X1 (ratio of number of atoms) | | X2 (ratio of number of atoms) | | | | | | |
| Sample No. | Example/ Comparative Example | Type | α{1 − (a + b + c + d + e + f)} | Type | β{1 − (a + b + c + d + e + f)} | O (mass ratio) (ppm) | XRD | Coercivity Hc (Oe) | Saturation magnetization σs (A · m²/kg) | Resistivity ρ at 0.1 t/cm² (Ω · cm) |
| 151 | Example | Co | 0.100 | Sn | 0.050 | 1340 | Amorphous phase | 2.8 | 165 | ⊙ |
| 152 | Example | Co | 0.100 | Cu | 0.050 | 1200 | Amorphous phase | 2.4 | 153 | ⊙ |
| 153 | Example | Co | 0.100 | Cr | 0.050 | 1260 | Amorphous phase | 2.5 | 154 | ⊙ |
| 154 | Example | Co | 0.100 | Bi | 0.050 | 1220 | Amorphous phase | 2.6 | 152 | ⊙ |
| 155 | Example | Co | 0.100 | La | 0.050 | 1270 | Amorphous phase | 2.7 | 151 | ⊙ |
| 156 | Example | Co | 0.100 | Y | 0.050 | 1280 | Amorphous phase | 2.8 | 156 | ⊙ |
| 157 | Example | Ni | 0.100 | Al | 0.050 | 1260 | Amorphous phase | 2.1 | 157 | ⊙ |
| 158 | Example | Ni | 0.100 | Zn | 0.050 | 1280 | Amorphous phase | 2.1 | 151 | ⊙ |
| 159 | Example | Ni | 0.100 | Sn | 0.050 | 1040 | Amorphous phase | 2.0 | 169 | ⊙ |
| 160 | Example | Ni | 0.100 | Cu | 0.050 | 1050 | Amorphous phase | 2.1 | 168 | ⊙ |
| 161 | Example | Ni | 0.100 | Cr | 0.050 | 1210 | Amorphous phase | 2.0 | 162 | ⊙ |
| 162 | Example | Ni | 0.100 | Bi | 0.050 | 1270 | Amorphous phase | 2.1 | 156 | ⊙ |
| 163 | Example | Ni | 0.100 | La | 0.050 | 1100 | Amorphous phase | 1.9 | 151 | ⊙ |
| 164 | Example | Ni | 0.100 | Y | 0.050 | 1230 | Amorphous phase | 2.3 | 151 | ⊙ |

TABLE 12

| | | $(Fe_{(1-\beta)}X2_{\beta})_{(1-(a+b+c+d+e+f))}M_aB_bP_cSi_dC_eS_f$ (α = 0, and X2 is Cu) Soft magnetic powder Composition (number for element other than O is ratio of number of atoms, and number for O is mass ratio) | | | | | | | | |
|---|---|---|---|---|---|---|---|---|---|---|
| Sample No. | Example/ Comparative Example | Fe + X2 | X2 (Cu) β{1 − (a + b + c + d + e + f)} | M a | B b | P c | Si d | C e | S f | O (ppm) |
| 171 | Example | 0.880 | 0.000 | 0.000 | 0.090 | 0.010 | 0.020 | 0.000 | 0.000 | 1045 |
| 171a | Example | 0.840 | 0.000 | 0.000 | 0.090 | 0.010 | 0.060 | 0.000 | 0.000 | 1089 |
| 172 | Example | 0.870 | 0.001 | 0.000 | 0.090 | 0.010 | 0.020 | 0.010 | 0.000 | 1075 |
| 172a | Example | 0.830 | 0.001 | 0.000 | 0.090 | 0.010 | 0.060 | 0.010 | 0.000 | 1056 |
| 172b | Example | 0.840 | 0.001 | 0.000 | 0.090 | 0.020 | 0.020 | 0.030 | 0.000 | 1040 |
| 172c | Example | 0.800 | 0.001 | 0.000 | 0.090 | 0.020 | 0.060 | 0.030 | 0.000 | 1067 |
| 173 | Example | 0.840 | 0.007 | 0.000 | 0.100 | 0.000 | 0.060 | 0.000 | 0.000 | 1043 |
| 174 | Example | 0.840 | 0.007 | 0.000 | 0.100 | 0.020 | 0.040 | 0.000 | 0.000 | 1032 |
| 175 | Example | 0.840 | 0.007 | 0.000 | 0.100 | 0.040 | 0.020 | 0.000 | 0.000 | 1054 |
| 176 | Example | 0.840 | 0.007 | 0.000 | 0.100 | 0.060 | 0.000 | 0.000 | 0.000 | 1056 |
| 177 | Example | 0.840 | 0.007 | 0.000 | 0.050 | 0.080 | 0.030 | 0.000 | 0.000 | 1076 |
| 178 | Example | 0.840 | 0.007 | 0.000 | 0.130 | 0.020 | 0.010 | 0.000 | 0.000 | 1020 |

| | $(Fe_{(1-\beta)}X2_{\beta})_{(1-(a+b+c+d+e+f))}M_aB_bP_cSi_dC_eS_f$ (α = 0, and X2 is Cu) Powder characteristics | | | |
|---|---|---|---|---|
| Sample No. | XRD | Coercivity Hc (Oe) | Saturation magnetization σs (A · m²/kg) | Resistivity ρ at 0.1 t/cm² (Ω · cm) |
| 171 | Amorphous phase | 3.9 | 196 | ⊙ |
| 171a | Amorphous phase | 3.2 | 183 | ⊙ |
| 172 | Amorphous phase | 3.8 | 194 | ⊙ |
| 172a | Amorphous phase | 2.9 | 181 | ⊙ |
| 172b | Amorphous phase | 3.1 | 185 | ⊙ |
| 172c | Amorphous phase | 2.8 | 172 | ⊙ |
| 173 | Amorphous phase | 3.2 | 186 | ⊙ |
| 174 | Amorphous phase | 2.9 | 183 | ⊙ |
| 175 | Amorphous phase | 2.8 | 184 | ⊙ |
| 176 | Amorphous phase | 2.7 | 182 | ⊙ |
| 177 | Amorphous phase | 2.9 | 183 | ⊙ |
| 178 | Amorphous phase | 2.8 | 184 | ⊙ |

Table 1 describes Comparative Examples having the composition of a generally well known amorphous alloy, and Examples and Comparative Examples having particular compositions, in which the oxygen amount was changed.

As can be seen in Table 1, soft magnetic powders having conventional compositions do not have sufficient saturation magnetization σs. In Examples having compositions within particular ranges and having the oxygen amount controlled to be from 300 ppm to 3,000 ppm as a mass ratio, suitable results were obtained for the coercivity Hc, the saturation magnetization σs, and the resistivity ρ. Furthermore, in Examples in which the oxygen amount was controlled to be from 800 ppm to 2,000 ppm, more suitable results were obtained for the resistivity ρ. In contrast, in Comparative Examples that had particular compositions but had an oxygen amount of less than 300 ppm, the resistivity ρ decreased. Furthermore, in Comparative Examples having an oxygen amount of more than 3,000 ppm, the saturation magnetization σs and the resistivity ρ were decreased.

Table 2 describes Examples and Comparative Examples in which the M (Nb) content (a) was mainly changed. In Examples where $0 \le a \le 0.140$, suitable results were obtained for the coercivity Hc, the saturation magnetization σs, and the resistivity ρ. Furthermore, in Examples where $0.040 \le a \le 0.140$, more suitable results were obtained for the resistivity ρ. In contrast, in Comparative Examples in which M content (a) was too large, the saturation magnetization σs was decreased.

Table 3 describes Examples and Comparative Examples in which the B content (b) was mainly changed. In Examples where $0.020 < b \le 0.200$, suitable results were obtained for the coercivity He, the saturation magnetization σs, and the resistivity ρ. Furthermore, in Examples where $0.060 \le b \le 0.200$, more suitable results were obtained for the resistivity ρ. In contrast, in Comparative Examples in which B content (b) was too small, the soft magnetic powder before a heat treatment was formed of a crystalline phase, and the coercivity He after a heat treatment was markedly increased. Furthermore, in Comparative Examples in which B content (b) was too large, the saturation magnetization σs was decreased.

Table 4 describes Examples and Comparative Examples in which the P content (c) was mainly changed. In Examples where $0 < c \le 0.150$, suitable results were obtained for the coercivity Hc, the saturation magnetization σs, and the resistivity ρ. Furthermore, in Examples where $0.010 \le c \le 0.150$, more suitable results were obtained for the resistivity ρ. In contrast, in Comparative Examples where c=0, the coercivity He was increased. Furthermore, in Comparative Examples in which P content (c) was too large, the saturation magnetization σs was decreased.

Table 5 describes Examples in which all of the M (Nb) content (a), the B content (b), and the P content (c) were changed. In Examples in which all of the M content (a) (Nb), the B content (b), and the P content (c) were changed within particular ranges, suitable results were obtained in all of the coercivity Hc, the saturation magnetization σs, and the resistivity ρ.

Table 6 describes Examples and Comparative Examples in which the Si content (d) was mainly changed. In Examples where $0 \le d \le 0.060$, suitable results were obtained for the coercivity Hc, the saturation magnetization σs, and the resistivity ρ. In contrast, in Comparative Examples in which Si content (d) was too large, the coercivity He increased, and the saturation magnetization σs decreased.

Table 7 describes Examples and Comparative Examples in which the C content (e) was mainly changed. In Examples where $0 \le e \le 0.030$, suitable results were obtained for the coercivity Hc, the saturation magnetization σs, and the resistivity ρ. Furthermore, in Examples where $0 \le e \le 0.010$, more suitable results were obtained for the resistivity ρ. In contrast, in Comparative Examples in which C content (e) was too large, the coercivity He increased.

Table 8 describes Examples and Comparative Examples in which the S content (f) was mainly changed. In Examples where $0 \le f \le 0.010$, suitable results were obtained for the coercivity Hc, the saturation magnetization σs, and the resistivity ρ. In contrast, in Comparative Examples in which S content (f) was too large, the coercivity He increased.

Table 9 describes Examples in which all of Si, C, and S were incorporated into Sample Nos. 34, 35, and 5, which did not contain all of Si, C, and S. In Examples in which all of Si, C, and S were incorporated within particular ranges, suitable results were obtained for all of the coercivity Hc, the saturation magnetization σs, and the resistivity ρ.

Table 10 describes Examples in which the kind of M was changed. In Examples in which the composition was within particular ranges even if the kind of M was changed, suitable results were obtained for all of the coercivity Hc, the saturation magnetization σs, and the resistivity ρ.

Table 11 describes Examples in which a part of Fe was substituted with X1 and/or X2. In Examples in which the composition was within particular ranges even if a part of Fe was substituted with X1 and/or X2, suitable results were obtained for all of the coercivity Hc, the saturation magnetization σs, and the resistivity ρ.

Table 12 describes Examples that did not include M (Examples in which a=0). In Examples in which the composition was within particular ranges even if M was not included, suitable results were obtained for all of the coercivity Hc, the saturation magnetization σs, and the resistivity ρ.

Experiment Example 2

In Experiment Example 2, Examples in which the temperature of the molten metal and the heat treatment conditions were changed from those of Sample No. 5, were carried out. The results are presented in the following tables. Meanwhile, in Sample No. 181, crystals were not produced before a heat treatment as well as after a heat treatment, and a structure having an amorphous phase only was obtained. Sample No. 181a had a structure having only an amorphous phase before a heat treatment; however, after a heat treatment, the specimen had a structure having Fe-based nanocrystals. Sample Nos. 182 and 182a had a nanohetero structure before a heat treatment as well as after a heat treatment. Sample Nos. 182b and 183 to 189 all had a nanohetero structure before a heat treatment; however, after a heat treatment, the specimens all had a structure having Fe-based nanocrystals.

TABLE 13

| | | Soft magnetic metal powder Fe(1 − (a + b + c + d + e + f))MaBbPcSidCeSf (a = b = 0, a to f are the same as Sample No. 5, and M is Nb) | | | | |
|---|---|---|---|---|---|---|
| Sample No. | Example/ Comparative Example | Temperature of molten metal (° C.) | Average particle size of microcrystals before heat treatment (nm) | Heat treatment temperature (° C.) | Heat treatment time (h) | Average particle size of crystals after heat treatment (nm) |
| 181 | Example | 1200 | None | 300 | 1 | None |
| 181a | Example | 1200 | None | 600 | 1 | 10 |
| 182 | Example | 1225 | 0.1 | 300 | 1 | 0.2 |
| 182a | Example | 1225 | 0.1 | 350 | 1 | 0.3 |
| 182b | Example | 1225 | 0.1 | 450 | 1 | 3 |
| 183 | Example | 1250 | 0.3 | 500 | 1 | 5 |
| 184 | Example | 1250 | 0.3 | 550 | 1 | 10 |
| 185 | Example | 1250 | 0.3 | 575 | 1 | 13 |
| 5 | Example | 1250 | 0.3 | 600 | 1 | 10 |
| 186 | Example | 1275 | 10 | 600 | 1 | 12 |
| 187 | Example | 1275 | 10 | 650 | 1 | 30 |
| 188 | Example | 1300 | 15 | 600 | 1 | 17 |
| 189 | Example | 1300 | 15 | 650 | 10 | 50 |

| | Soft magnetic metal powder Fe(1 − (a + b + c + d + e + f))MaBbPcSidCeSf (a = b = 0, a to f are the same as Sample No. 5, and M is Nb) | | | | | |
|---|---|---|---|---|---|---|
| | | | Powder characteristics | | | |
| Sample No. | Amorphous phase after heat treatment | O (ppm) | XRD | Coercivity Hc (Oe) | Saturation magnetization σs (A · m²/kg) | Resistivity ρ at 0.1 t/cm² (Ω · cm) |
| 181 | Present | 1032 | Amorphous phase | 2.1 | 151 | ⊙ |
| 181a | Absent | 1045 | Amorphous phase | 2.3 | 164 | ⊙ |
| 182 | Present | 845 | Amorphous phase | 3.2 | 153 | ⊙ |
| 182a | Present | 934 | Amorphous phase | 2.8 | 155 | ⊙ |
| 182b | Absent | 1034 | Amorphous phase | 2.4 | 166 | ⊙ |
| 183 | Absent | 1032 | Amorphous phase | 2.1 | 166 | ⊙ |
| 184 | Absent | 1056 | Amorphous phase | 2.2 | 168 | ⊙ |
| 185 | Absent | 1078 | Amorphous phase | 1.9 | 170 | ⊙ |
| 5 | Absent | 1093 | Amorphous phase | 2.2 | 175 | ⊙ |
| 186 | Absent | 1053 | Amorphous phase | 2.1 | 172 | ⊙ |
| 187 | Absent | 1043 | Amorphous phase | 2.2 | 171 | ⊙ |
| 188 | Absent | 1067 | Amorphous phase | 2.4 | 170 | ⊙ |
| 189 | Absent | 1045 | Amorphous phase | 3.7 | 162 | ⊙ |

From Table 13, in Examples in which the composition was within particular ranges even if the structure was changed as described above, suitable results were obtained in all of the coercivity Hc, the saturation magnetization σs, and the resistivity ρ.

Experiment Example 3

In Experiment Example 3, the number of maximum points of the Fe content proportion, the proportion of maximum points having a coordination number of from 1 to 5, the proportion of maximum points having a coordination number of from 2 to 4, and the content proportion of the Fe composition network phase with respect to the entirety of a specimen were measured for various specimens, using three-dimensional atom probe (3DAP). The results are presented in Table 14. Meanwhile, the various Examples described in Table 14 are Examples in which the composition was identical to Sample No. 5 of Experiment Example 1, and the number of maximum points and the volume proportion of the Fe composition network phase were mainly changed by controlling the spray conditions of atomization and the heat treatment temperature.

TABLE 14

| | | | | Fe composition network phase | | |
|---|---|---|---|---|---|---|
| Sample No. | Example/ Comparative Example | Temperature of molten metal (° C.) | Water vapor pressure (Pa) | Number of maximum points (10,000 points/μm³) | Coordination number of from 1 to 5 (%) | Coordination number of from 2 to 4 (%) |
| 191 | Example | 1300 | 4 | 93 | 92 | 82 |
| 192 | Example | 1275 | 4 | 110 | 94 | 83 |
| 193 | Example | 1250 | 4 | 114 | 95 | 82 |
| 194 | Example | 1225 | 4 | 121 | 93 | 81 |

TABLE 14-continued

| Sample No. | Fe composition network phase Volume proportion (vol %) | Composition O (mass ratio) (ppm) | XRD | Coercivity Hc (Oe) | Saturation magnetization σs ($A \cdot m^2/kg$) | Resistivity ρ at 0.1 $t/cm^2$ ($\Omega \cdot cm$) |
|---|---|---|---|---|---|---|
| 191 | 26 | 1210 | Amorphous phase | 1.7 | 168 | ⊙ |
| 192 | 38 | 1100 | Amorphous phase | 1.5 | 173 | ⊙ |
| 193 | 45 | 1210 | Amorphous phase | 1.6 | 174 | ⊙ |
| 194 | 50 | 1180 | Amorphous phase | 1.8 | 179 | ⊙ |

From Table 14, in a case in which the composition of the soft magnetic powder was within particular ranges, the soft magnetic powder was formed of the Fe composition network phase, and the volume proportion of the Fe composition network phase was from 25 vol % to 50 vol %, suitable results were obtained for the coercivity Hc, the saturation magnetization σs, and the resistivity ρ.

DESCRIPTION OF THE REFERENCE NUMERAL

10 grid
10*a* maximum point
10*b* adjacent grid
20*a* regions having a greater Fe content proportion than the threshold value
20*b* regions having Fe content proportions less than or equal to the threshold value

What is claimed is:

1. A soft magnetic powder comprising a main component represented by the following composition formula, by atomic ratio:

$$(Fe_{(1-(\alpha+\beta))}X1_{\alpha}X2_{\beta})_{(1-(a+b+c+d+e+f))}M_aB_bP_cSi_dC_eS_f,$$

wherein X1 represents one or more selected from the group consisting of Co and Ni,
X2 represents one or more selected from the group consisting of Al, Zn, Sn, Cu, Cr, Bi, La, and Y,
M represents Nb,
$0.040 \le a \le 0.140$;
$0.025 < b \le 0.200$;
$0.001 < c \le 0.150$;
$0 \le d \le 0.060$;
$0 \le e \le 0.030$;
$0 \le f \le 0.010$;
$0 \le \alpha\{1-(a+b+c+d+e+f)\} \ge 0.400$;
$0 \le \beta\{1-(a+b+c+d+e+f)\} \ge 0.030$;
$0 \le \alpha+\beta \le 0.50$,
an oxygen content ratio in the soft magnetic powder is from 321 ppm to 2,831 ppm as a mass ratio, and
coercivity Hc is 3.2 Oe or less.

2. The soft magnetic powder according to claim 1, wherein the soft magnetic powder is amorphous.

3. The soft magnetic powder according to claim 1, wherein the soft magnetic powder comprises an amorphous phase and microcrystals, and a nanohetero structure with the microcrystals existing in the amorphous phase is contained.

4. The soft magnetic powder according to claim 3, wherein the microcrystals have an average particle size of 0.3 to 10 nm.

5. The soft magnetic powder according to claim 1, wherein a structure comprised of Fe-based nanocrystals is contained.

6. The soft magnetic powder according to claim 5, wherein the Fe-based nanocrystals have an average particle size of from 3 nm to 50 nm.

7. The soft magnetic powder according to claim 1, wherein a Fe composition network phase in which regions having a higher Fe content proportion than the Fe content proportion included in the entirety of the soft magnetic powder are connected is contained,
the Fe composition network phase has maximum points of 400,000 or more points/$\mu m^3$ of the Fe content proportion, at which the Fe content proportion becomes locally higher than that of the surroundings, and
the proportion of maximum points of the Fe content proportion having a coordination number of from 1 to 5 is from 80% to 100%, among all of the maximum points of the Fe content proportion.

8. The soft magnetic powder according to claim 7, wherein a volume proportion occupied by the Fe composition network phase in the entirety of the soft magnetic powder is from 25 vol % to 50 vol %.

9. The soft magnetic powder according to claim 1, wherein a volume resistivity in a state of being compacted at a pressure of 0.1 $t/cm^2$ is from 0.5 kΩ·cm to 500 kΩ·cm.

10. A pressed powder body comprising the soft magnetic powder according to claim 1.

11. A magnetic component comprising the pressed powder body according to claim 10.

12. The soft magnetic powder according to claim 1, wherein a volume resistivity in a state of being compacted at a pressure of 0.1 $t/cm^2$ is 3 kΩ·cm or higher.

13. The soft magnetic powder according to claim 1, wherein a volume resistivity in a state of being compacted at a pressure of 0.1 $t/cm^2$ is from 3 kΩ·cm to 500 kΩ·cm.

14. The soft magnetic powder according to claim 1, wherein $0.060 \le b \le 0.200$, $0.010 \le c \le 0.150$, $0 \le e \le 0.020$, the oxygen content ratio in the soft magnetic powder is from 820 ppm to 1,975 ppm as a mass ratio, and a volume resistivity in a state of being compacted at a pressure of 0.1 $t/cm^2$ is from 3 kΩ·cm or higher.

* * * * *